March 3, 1953  M. E. PETERSEN  2,630,333
OSCILLATING TREADLE PROPELLING MECHANISM FOR BICYCLES
Filed March 5, 1951  3 Sheets-Sheet 1

INVENTOR.
MARIUS E. PETERSEN
BY
Frederick Diehl
ATTORNEY

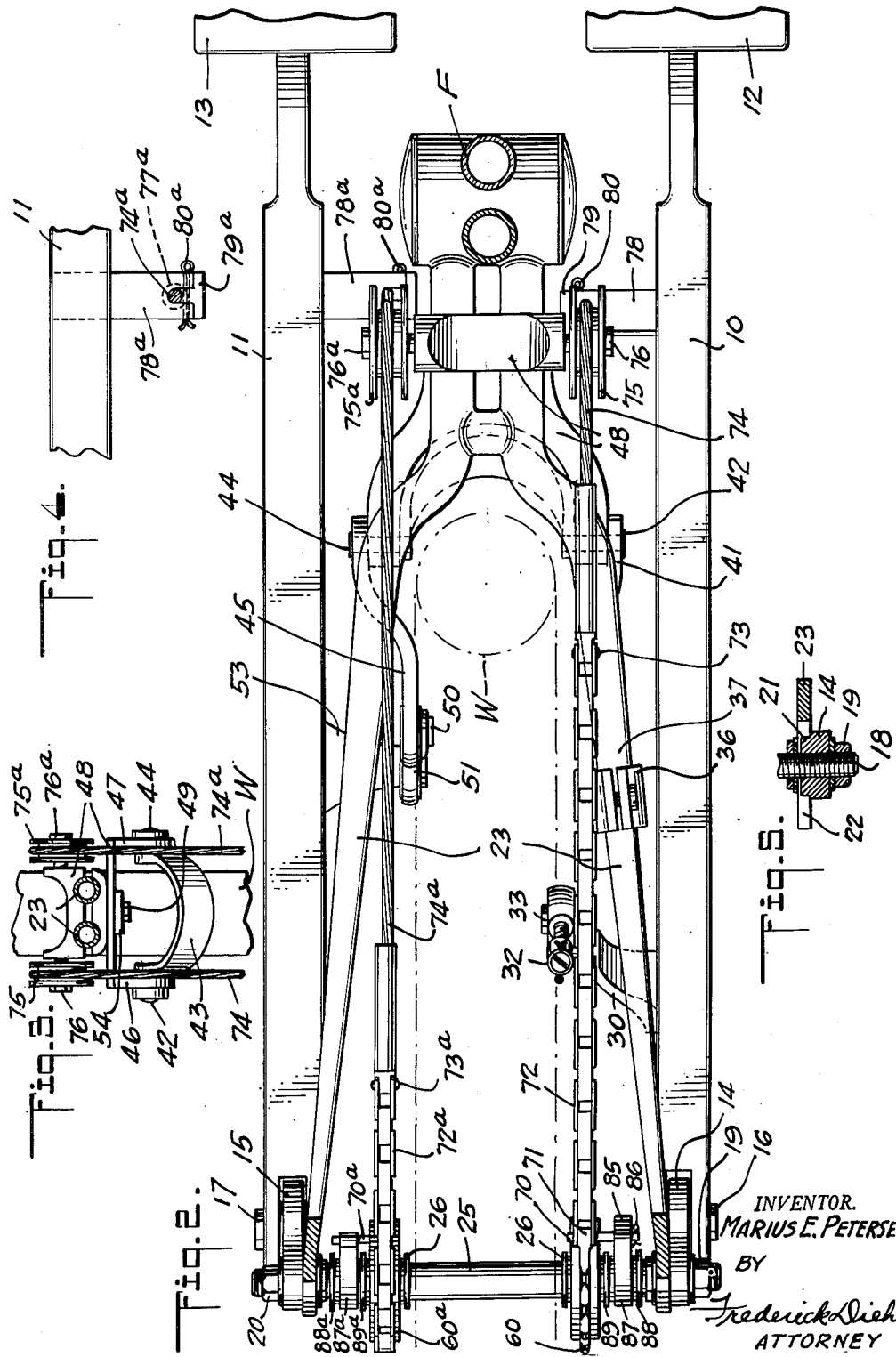

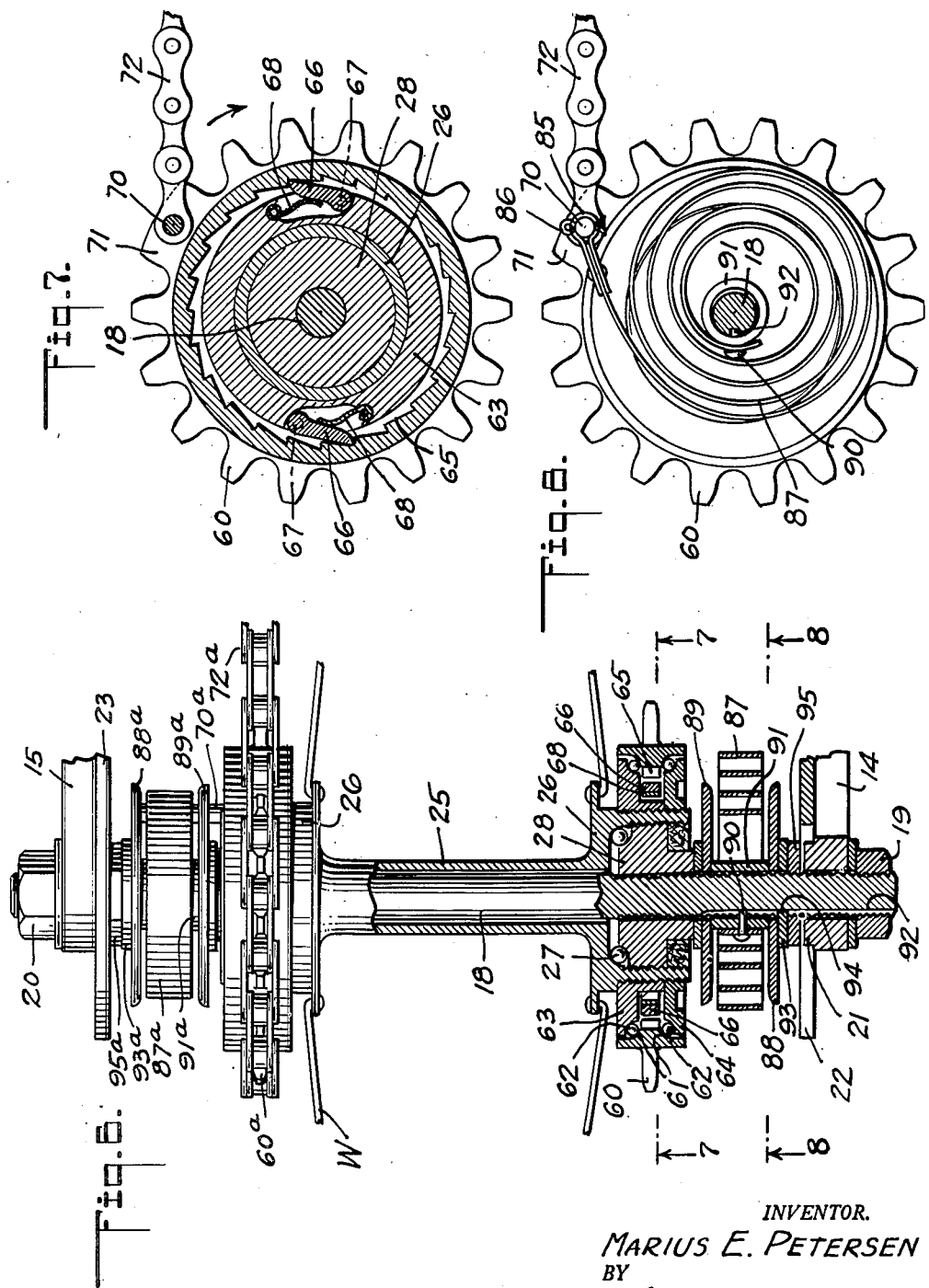

Patented Mar. 3, 1953

2,630,333

UNITED STATES PATENT OFFICE 2,630,333

OSCILLATING TREADLE PROPELLING MECHANISM FOR BICYCLES

Marius E. Petersen, Los Angeles, Calif.

Application March 5, 1951, Serial No. 213,929

2 Claims. (Cl. 280—255)

My invention relates generally to vehicles and more particularly to bicycles.

An object of my invention is to provide a bicycle embodying a propelling mechanism structurally characterized in a manner to dispense with the well known rotary cranks and their attending energy-wasting movements during a large portion of a revolution, and to substitute therefor vertically reciprocating or oscillating treadles which are operatively connected to the wheel so as to transmit torque thereto in response to downward movement of the treadles with a minimum expenditure of energy and under such control of the operator that variable power strokes can be imparted to the treadles as is most convenient to the length of the legs of the operator, all so as to obtain the maximum amount of power from the propelling mechanism and to enable a child to propel a full size bicycle as easily as an adult.

Another object of my invention is to provide a bicycle propelling mechanism of the above described character which weighs considerably less than the propelling mechanism embodying rotary cranks, and which may be substituted therefor by being applied to any bicycle as an article of manufacture with the utmost ease and dispatch and at a reasonable cost.

With these and other objects in view, my invention resides in the combinations, arrangements and functional relationships of elements as set forth in the following specification and particularly pointed out in the appended claims.

In the accompanying drawings,

Figure 2 is an enlarged horizontal sectional view taken on the line 2—2 of Figure 1;

Figure 3 is a fragmentary vertical transverse sectional view taken on the line 3—3 of Figure 1;

Figure 4 is a fragmentary plan view of a detachable connection between each treadle and its operative connection to the bicycle wheel;

Figure 5 is an enlarged detail sectional view taken on the line 5—5 of Figure 1;

Figure 1:
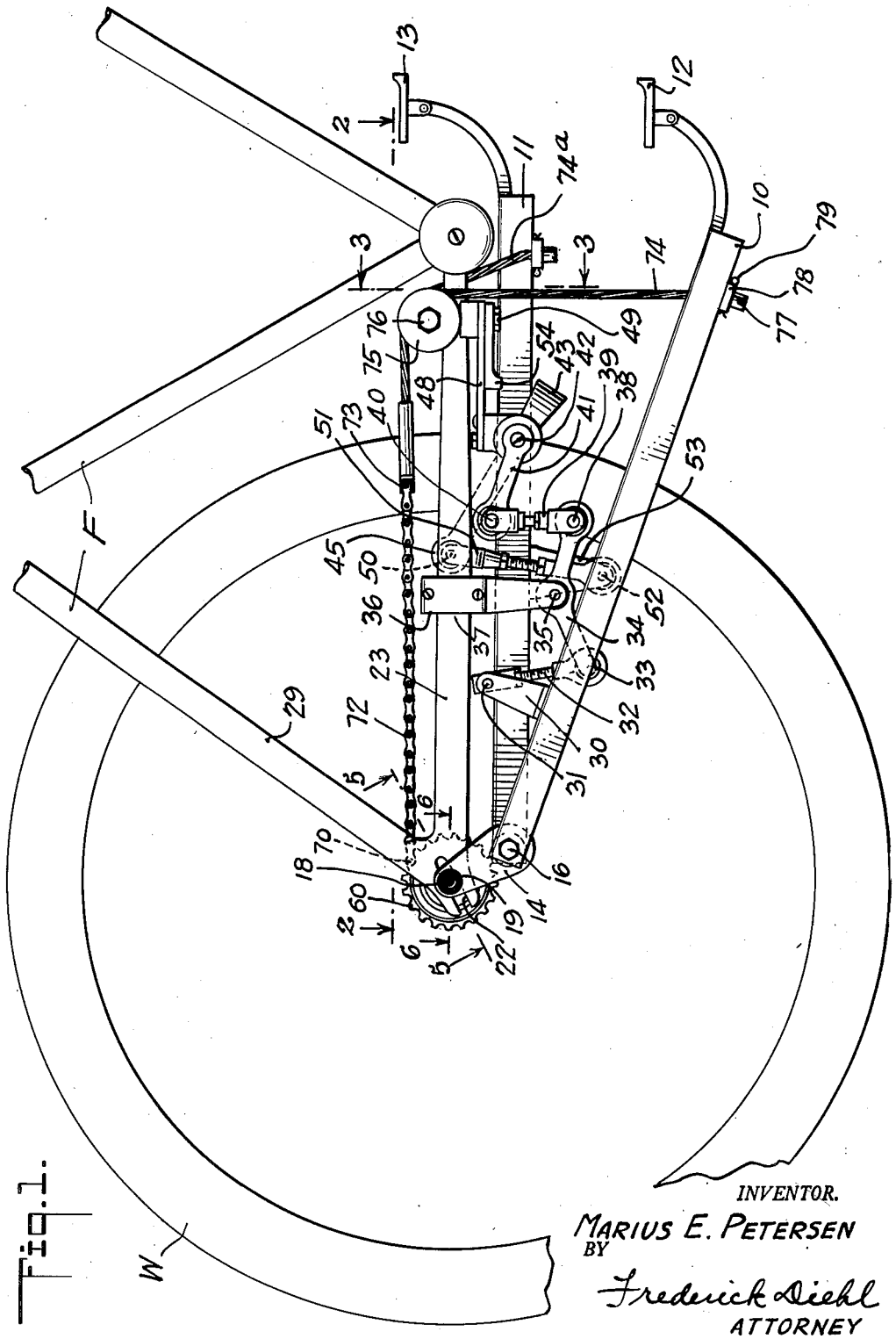
Figure 1 is a view in side elevation, showing the rear portion of a bicycle with one form of propelling mechanism embodying my invention applied thereto.

Figure 6 is an enlarged horizontal sectional view taken generally on the line 6—6 of Figure 1, with a portion left in elevation; and Figures 7 and 8 are vertical sectional views taken on the lines 7—7 and 8—8, respectively, of Figure 6.

Referring specifically to the drawings, my invention, in its illustrated embodiment, comprises right and left treadles 10 and 11 having pedals 12 and 13, respectively, pivotally mounted on their forward ends for limited rocking movements, and being bifurcated at their rear ends to receive short arms 14 and 15, on the lower ends of which the treadles are pivotally mounted by means of bolts 16 and 17, the arms having openings receiving the outer ends of the stationary axle 18 for the wheel W, and being clamped against the outer sides of the frame by nuts 19 and 20 screwed on the axle. The arms 14 and 15 which are identical in construction, are provided with key lugs 21 entering the usual slots 22 in the rear fork 23 of the frame F which receive the end portions of the axle. The lugs 21 co-act with the slots 22 to lock the arms 14 and 15 rigidly to the frame against rotation, so that the pivot bolts 16 and 17 provide fixed fulcrums to mount the treadles at opposite sides of the frame for reciprocating or oscillating movements vertically between the two extreme positions shown in Figure 1.

The axle 18 serves to support the rear or driving wheel W in the frame F by means of the wheel hub 25 which has cup shaped heads 26 at its ends (Figure 6) forming the outer races for ball bearings 27. Retaining nuts 28 are screwed into the respective heads 26 and form the inner races for the bearings 27 so as to rotatably mount the wheel W on the axle 18 in the rear forks 23 and 29 of the frame.

The treadles 10 and 11 are operatively connected positively so as to alternately move up and down about the common axis of the pivot bolts 16 and 17, by means of a mechanism comprising a bracket 30 fixed to the right treadle 10 and having pivoted thereon at 31 one end of a link 32 the other end of which is pivotally connected at 33 to one end of a lever 34 pivotally mounted intermediate its ends at 35 on a bracket 36 fixed to the right hand member 37 of the rear fork 23. To the opposite end of the lever 34 is pivotally connected at 38 one end of a link 39 the other end of which is pivotally connected at 40 to one end of an arm 41 the other end of which is fixed to one of the trunnions 42 on the ends of a U-shaped stop member 43, the other trunnion 44 of which has fixed thereto one end of a second arm 45 co-acting with the arm 41 to define a single compound lever.

The trunnions 42 and 44 are mounted in bearings 46 and 47, respectively, at opposite sides of the wheel W, and these bearings are fixed to the lower part of a two-part bracket 48 clamped by a bolt 49 to the frame fork 23 in advance of the wheel as shown in Figure 3. The other end of the arm 45 has pivotally connected thereto at 50 one end of a link 51 the other end of which is pivotally mounted at 52 on a bracket 53 fixed to the left treadle 11. By means of this compound lever and link connection between the treadles 10 and 11 as just described, downward movement imparted to either treadle by the operator will positively impart a corresponding upward movement to the other treadle, these motions being definitely limited by engagement of the stop member 43 with an abutment 54 fixed to the lower part of the bracket 48 by the bolt 49.

The treadles 10 and 11 are each operatively connected to the wheel W by identical mechanisms so that a detailed description of one mechanism will suffice for both. However, to distinguish like parts of the two mechanisms from each other, the reference characters designating the parts of one mechanism will be provided with exponents.

The mechanism for the treadle 10 comprises a driving element in the form of a sprocket wheel 60 having opposed outer races 61 for ball bearings 62, the inner races of which are provided by a driven element in the form of a ring 63 screwed tightly on one of the heads 26 of the wheel hub 25 so as to be rigidly secured thereto for rotation therewith, and a retaining ring nut 64 also screwed onto the head 26, all as clearly shown in Figure 6.

Between the outer races 61, the sprocket wheel 60 is provided internally with a ratchet wheel 65 the teeth of which co-act with pawls 66 pivotally mounted on the ring 63 by pins 67 and urged by springs 68 into engagement with the ratchet teeth. The ratchet wheel 65 and the pawls 66 provide a uni-directional rotary clutch operable to provide a driving connection between the sprocket wheel 60 and the bicycle W to drive the latter forwardly upon rotation of the sprocket wheel in a clockwise direction as viewed in Figure 7.

Pivotally connected by a pin 70 to a lug 71 on the sprocket wheel 60 which interrupts the teeth of the wheel, is one end of a sprocket chain 72 the other end of which is pivotally connected by a pin 73 to one end of a flexible cable 74 trained about a flanged pulley 75 rotatably mounted on a pin 76 projecting from the upper part of the two-part bracket 48 as clearly shown in Figures 2 and 3. The other end of the cable 74 is fixed to a head 77 and passes through an opening formed between a bracket 78 on the treadle 10 and a keeper 79 which is detachably secured to the bracket by a cotter pin 80 passing through registering openings in the bracket and keeper, all so as to enable the cable to be connected to and disconnected from the treadle for easy assembly and disassembly.

The pin 70 projects from the chain 72 at the outer side thereof, and connected to this pin by an eye 85 and a cotter pin 86 is one end of a flat coil spring 87 mounted freely between a pair of guard plates 88 and 89, and connected at its other end by a headed pin 90 to a sleeve 91 mounted on the stationary axle 18, the inner end of the pin projecting into a keyway 92 in the axle, so as to secure the inner end of the spring to the axle against rotation. A washer 93 is mounted on the axle and is provided with a key 94 fitting into the keyway 92, and a nut 95 is tightened against the washer to bind the plates 88 and 89 and the sleeve 91 tightly together against the retaining nut 28, all as clearly shown in Figure 6.

In operation, with the springs 87 and 87a loaded or wound to exert a relatively light pull upon the respective treadle 10 or 11 when occupying its extreme raised position, a downward push by the foot of the operator upon one treadle or the other will exert a pull upon the corresponding cable 74 and chain 72, or the cable 74a and chain 72a as the case may be, and will cause the respective sprocket wheel 60 or 60a to co-act with the respective pawls 66 or 66a in driving the wheel W forwardly.

Upon upward movement of either treadle, the respective spring 87 or 87a which has been further wound by downward movement of the treadle, effects retrograde rotation of the respective sprocket wheel so as to pull upon the respective chain and cable to maintain them taut as upward movement of the treadle progresses, thus restoring the parts to their original positions when the treadle reaches its extreme raised position.

Any desired downward power stroke may be imparted to the treadles to effect forward rotation of the wheel W, thus enabling riders of all ages, to ride a full size bicycle so long as the riders' legs can reach and depress the treadles to any extent.

In applying my invention to a bicycle of standard manufacture, the usual driving sprocket wheel and its pair of cranks and pedals, as well as the rear wheel hub are removed and my invention substituted without the necessity of drilling or in any way structurally weakening the frame F or otherwise modifying the construction of the bicycle.

I claim:

1. In a bicycle having a frame and a driving wheel journaled in the frame, a propelling mechanism comprising: right and left foot treadles; means mounting the treadles from said frame at opposite sides thereof for oscillating movement vertically between extreme raised and lowered positions; unidirectional rotary clutches, one for each treadle, by which forward rotational movement may be transmitted to said driving wheel; and means, one for each treadle, operatively connecting a treadle to the respective one of said clutches to effect forward rotation of the driving wheel in response to downward movement of the treadle; and mechanism operatively interconnecting the treadles for alternate upward and downward movements; said mechanism for operatively interconnecting the treadles comprising a link pivotally connected at one end to one treadle; a lever pivotally mounted intermediate its ends about a fixed axis on said frame; means pivotally connecting the other end of said link to one end of said lever; a second link pivotally connected at one end to the other end of said lever; a compound lever having two arms; means pivotally mounting said compound lever about a fixed axis on said frame; means pivotally connecting the other end of said second link to one of said arms; a third link pivotally mounted at one end on the other treadle; and means pivotally connecting the other end of said third link to the other of said arms.

2. In a bicycle having a frame including a rear fork, the members of which are spanned by a stationary axle on which the hub of the driving wheel is rotatably mounted, a propelling mechanism comprising: arms projecting from said axle on the outer sides of said frame and rigidly secured thereto; right and left foot treadles pivotally mounted at their rear ends on said arms for oscillating movement vertically between extreme raised and lowered positions, and having pedals mounted on their forward ends; unidirectional rotary clutches, one for each treadle, by which forward rotational movement may be transmitted to said driving wheel; each of said clutches comprising a ring having spring-urged pawls and fixed to the hub of the driving wheel, and a sprocket wheel rotatably mounted on said hub and having an internal ratchet wheel with the teeth of which said pawls are engaged; sprocket chains, one for each of said sprocket wheels and secured at one end to the respective sprocket wheel for meshing engagement therewith; pulleys, one for each sprocket chain, rotatably mounted on said frame; flexible cables connected to said treadles and to the respective sprocket chains, to effect forward rotation of the driving wheel in response to downward movement of the treadles; pairs of guard plates mounted on said axle at the outer sides of the sprocket wheels; coil springs mounted between the guard plates of each pair, with one end secured to said axle and the other end secured to the respective sprocket wheel so as to be loaded during downward movement of the treadles, and to effect retrograde rotation of the sprocket wheels and maintain said chains and cables taut during upward movement of the treadles; and a compound lever and link mechanism operatively interconnecting the treadles for alternate upward and downward movements; said mechanism for operatively interconnecting the treadles comprising a link pivotally connected at one end to one treadle; a lever pivotally mounted intermediate its ends about a fixed axis on said frame; means pivotally connecting the other end of said link to one end of said lever; a second link pivotally connected at one end to the other end of said lever; a compound lever having two arms; means pivotally mounting said compound lever about a fixed axis on said frame; means pivotally connecting the other end of said second link to one of said arms; a third link pivotally mounted at one end on the other treadle; and means pivotally connecting the other end of said third link to the other of said arms.

MARIUS E. PETERSEN.

REFERENCES CITED

The following references are of record in the file of this patent:

UNITED STATES PATENTS

| Number | Name | Date |
|---|---|---|
| 644,686 | Runyan et al. | Mar. 6, 1900 |

FOREIGN PATENTS

| Number | Country | Date |
|---|---|---|
| 3,118 | Great Britain | Dec. 1, 1904 |
| 8,392 | Sweden | Sept. 11, 1896 |
| 459,800 | Great Britain | Jan. 15, 1937 |